(12) United States Patent
Hamada

(10) Patent No.: US 8,479,282 B2
(45) Date of Patent: Jul. 2, 2013

(54) DENIAL-OF-SERVICE ATTACK DEFENSE SYSTEM, DENIAL-OF-SERVICE ATTACK DEFENSE METHOD, AND COMPUTER PRODUCT

(75) Inventor: Masaki Hamada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1529 days.

(21) Appl. No.: 10/579,891

(22) PCT Filed: Aug. 19, 2005

(86) PCT No.: PCT/JP2005/015155
§ 371 (c)(1),
(2), (4) Date: May 19, 2006

(87) PCT Pub. No.: WO2006/040880
PCT Pub. Date: Apr. 20, 2006

(65) Prior Publication Data
US 2007/0101428 A1   May 3, 2007

(30) Foreign Application Priority Data
Oct. 12, 2004  (JP) .................................. 2004-298244

(51) Int. Cl.
| G06F 11/00 | (2006.01) |
| G06F 12/14 | (2006.01) |
| G06F 12/16 | (2006.01) |
| G08B 23/00 | (2006.01) |

(52) U.S. Cl.
USPC .............. 726/22; 709/224; 713/175; 370/230

(58) Field of Classification Search
None
See application file for complete search history.

(56) References Cited

U.S. PATENT DOCUMENTS

| 6,301,668 | B1 * | 10/2001 | Gleichauf et al. ............... 726/25 |
| 6,609,205 | B1 * | 8/2003 | Bernhard et al. ................ 726/22 |
| 6,980,090 | B2 * | 12/2005 | Mollenkopf ................... 375/258 |
| 7,076,650 | B1 * | 7/2006 | Sonnenberg ................... 713/151 |
| 2002/0087885 | A1 * | 7/2002 | Peled et al. .................... 713/201 |
| 2003/0110394 | A1 * | 6/2003 | Sharp et al. .................... 713/200 |
| 2003/0135762 | A1 * | 7/2003 | Macaulay ...................... 713/201 |
| 2003/0145226 | A1 * | 7/2003 | Bruton et al. .................. 713/201 |

(Continued)

FOREIGN PATENT DOCUMENTS

| JP | 2003-283555 | 10/2003 |
| JP | 2003-283571 | 10/2003 |

(Continued)

OTHER PUBLICATIONS

Fuji, Hitoshi et al., Active Countermeasure Platform against DDoS Attacks, IEICE Transactions on Information and Systems, vol. E85-D, No. 12, pp. 1918-1928, 2002.

(Continued)

*Primary Examiner* — Nadia Khoshnoodi
(74) *Attorney, Agent, or Firm* — Oblon, Spivak, McClelland, Maier & Neustadt, L.L.P.

(57) ABSTRACT

A monitoring device is provided on a LAN to which a communication device that is a target of a denial-of-service attack is connected, and monitors a packet transmitted to the communication device via an ISP network. A restricting device is provided on the ISP network, and restricts a packet to the LAN. The monitoring device detects an attack by the packet on the communication device, and transmits protection request information indicating a request for protection against the attack to the restricting device. The restricting device restricts a packet transmitted to the communication device via the ISP network based on the protection request information.

14 Claims, 7 Drawing Sheets

U.S. PATENT DOCUMENTS

| | | | |
|---|---|---|---|
| 2004/0054925 A1* | 3/2004 | Etheridge et al. | 713/201 |
| 2004/0128550 A1* | 7/2004 | Govindarajan et al. | 713/201 |
| 2004/0148520 A1* | 7/2004 | Talpade et al. | 713/201 |
| 2004/0172557 A1* | 9/2004 | Nakae et al. | 713/201 |
| 2004/0199793 A1* | 10/2004 | Wilken et al. | 713/201 |
| 2004/0250124 A1* | 12/2004 | Chesla et al. | 713/201 |
| 2007/0067839 A1 | 3/2007 | Hamada et al. | |

FOREIGN PATENT DOCUMENTS

| | | |
|---|---|---|
| JP | 2003-283572 | 10/2003 |
| JP | 2004-54488 | 2/2004 |
| JP | 2004-166029 | 6/2004 |
| JP | 2004-280724 | 10/2004 |
| WO | WO 02/25402 A2 | 3/2002 |
| WO | WO 03/005666 A2 | 1/2003 |
| WO | WO 03/005666 A3 | 1/2003 |

OTHER PUBLICATIONS

Office Action issued Sep. 26, 2012 in European Patent Application No. 05 772 789.3-2413.

* cited by examiner

FIG.3

|   | DETECTION ATTRIBUTE | DETECTION THRESHOLD | DETECTION TIME |
|---|---|---|---|
| 1 | {Dst=192.168.1.1/32, Protocol=TCP, Port=80} | 500 kbps | 10 sec |
| 2 | {Dst=192.168.1.2/32, Protocol=UDP} | 300 kbps | 10 sec |
| 3 | {Dst=192.168.1.0/24} | 1 Mbps | 20 sec |

DENIAL-OF-SERVICE ATTACK DEFENSE SYSTEM, DENIAL-OF-SERVICE ATTACK DEFENSE METHOD, AND COMPUTER PRODUCT

TECHNICAL FIELD

The present invention relates to a denial-of-service attack defense system, a denial-of-service attack defense method, and a denial-of-service attack defense program for protecting a communication device against a denial-of-service attack, using a monitoring device that is provided on a local area network (LAN) connected with the communication device as a target of a denial-of-service attack and that monitors a packet transmitted to the communication device via an internal-service-provider (ISP) network, and also using a restricting device that is provided on the ISP network and restricts packets transmitted to the LAN. More particularly, the present invention relates to a denial-of-service attack defense system capable of protecting a communication device against a denial-of-service attack while ensuring privacy of communications and not deviating from a range of its original operations, and also to a denial-of-service attack defense method and a denial-of-service attack defense program.

BACKGROUND ART

There have been known attacks through networks such as denial-of-service attacks (including distributed denial-of-service attacks). In a denial-of-service attack defense system that protects communication devices against such denial-of-service attacks, an edge router provided on an ISP network protects a server machine (hereinafter, "communication device") as a target of an attack. Specifically, to protect a communication device against a SYN flood attack which is one of the denial-of-service attacks, the edge router on the ISP network provides a threshold for a traffic volume of SYN packets, and abandons some SYN packets at an exit of the LAN. More specifically, the ISP network is connected to the LAN including the communication device as the target of the attack, the transmission target of the SYN packets is the communication device, and the SYN packets to be abandoned are a portion which exceeds the threshold (see, for example, Patent document 1).

DISCLOSURE OF INVENTION

Problem to be Solved by the Invention

However, in the conventional denial-of-service attack defense system, the side of the ISP needs to perform such operations as monitor, determination, and control of the content of a packet to be transmitted to the communication device, but there are many cases where only a person who receives the packet can determinate whether the packet is an attack because the content should be interpreted by the person. Therefore, because it is necessary for the ISP to ensure privacy of communications and not to deviate from a range of its original operations, there still remain such problems that the operations performed by the ISP are limited except for some cases where an attack is determined as being apparent.

The present invention has been achieved to solve the problems in the conventional technology, and it is an object of the present invention to provide a denial-of-service attack defense system capable of protecting communication devices against denial-of-service attacks while an ISP ensures privacy of communications and does not deviate from a range of its original operations, a denial-of-service attack defense method, and a denial-of-service attack defense program.

Means for Solving Problem

To solve the above problems and to achieve the object, a denial-of-service attack defense system according to one aspect of the present invention, which is for protecting a communication device against a denial-of-service attack, includes a monitoring device configured to be provided on a local area network to which the communication device that is a target of the denial-of-service attack is connected, the monitoring device monitoring a packet transmitted to the communication device via an internet-service-provider network; and a restricting device configured to be provided on the internet-service-provider network, the restricting device restricting a packet to the local area network. The monitoring device includes an attack detecting unit that detects an attack by the packet on the communication device; and a protection-request-information transmitting unit that transmits protection request information indicating a request for protection against the attack to the restricting device. The restricting device includes a packet restricting unit that restricts a packet transmitted to the communication device via the internet-service-provider network based on the protection request information.

According to the present invention, the monitoring device detects an attack by packets transmitted to the communication device and transmits the protection request information indicating a request for protection against the attack, to the restricting device. The restricting device restricts packets transmitted to the communication device via the ISP network based on the protection request information received from the monitoring device. Therefore, the ISP is capable of protecting communication devices against the denial-of-service attacks while ensuring secrecy of communications and not deviating from the range of its original operations.

According to the present invention, the monitoring device further includes a signature generating unit that generates a signature indicating a feature of a packet that attacks the communication device. The protection-request-information transmitting unit transmits the protection request information including the signature to the restricting device. The packet restricting unit of the restricting device restricts a packet corresponding to the signature, which is to be transmitted to the communication device.

According to the present invention, the monitoring device generates a signature indicating a feature of a packet which attacks the communication device, and transmits the protection request information including the signature generated to the restricting device. The restricting device restricts the packet which is toward the communication device and corresponds to the signature received. Therefore, the restricting device can restrict the packet transmitted to the communication device based on the signature indicating the feature of the packet which attacks, which allows the ISP to protect communication devices against the denial-of-service attacks while ensuring secrecy of communications and not deviating from the range of its original operations.

According to the present invention, the restricting device further includes a signature determining unit that determines whether the protection request information including the signature is appropriate. The packet restricting unit restricts a packet corresponding to a signature that is determined to be appropriate by the signature determining unit, which is to be transmitted to the communication device, and does not restrict a packet corresponding to a signature that is determined to be inappropriate, which is to be transmitted to the communication device.

According to the present invention, the restricting device determines whether the protection request information including the signature is appropriate, restricts a packet which is toward the communication device and corresponds to the signature that is determined as being appropriate, and does not restrict a packet which is toward the communication device and corresponds to the signature that is determined as being in appropriate. Therefore, when the signature is inappropriate, packets are not restricted. Thus, it is possible to prevent the restricting device from restricting packets such as those which are supposed to be transmitted to another LAN and of which restriction should not be requested by the monitoring device.

According to the present invention, the restricting device further includes a report generating unit that generates a report on a feature and an amount of a packet corresponding to the signature; and a report transmitting unit that transmits the report to the monitoring device. The signature generating unit generates a new signature based on the report. The protection-request-information transmitting unit transmits the protection request information including the new signature to the restricting device. The packet restricting unit restricts a packet corresponding to the new signature, which is to be transmitted to the communication device.

According to the present invention, the restricting device generates a report on features of a packet which corresponds to the signature and on its amount, and transmits the report generated to the monitoring device. The monitoring device generates a new signature based on the report received, and transmits protection request information including the new signature to the restricting device, and then the restricting device restricts a packet which is toward the communication device and corresponds to the new signature. Therefore, when there is an attack on the communication device, suspicious packets that may attack are restricted, and then a packet which attacks is identified based on the report. Thus, it is possible to remove the restriction of a packet which does not attack the communication device.

According to the present invention, the restricting device further includes a forwarding unit that forwards the protection request information to other restricting device provided on the internet-service-provider network. The forwarding unit determines whether to forward the protection request information based on the report generated by the report generating unit, and forwards the protection request information to the other restricting device upon determining that it is necessary to forward the protection request information.

According to the present invention, the restricting device determines whether the protection request information should be forwarded based on the report generated a the report generating unit, and forwards the protection request information to another restricting device when it is determined that the forwarding is necessary. Therefore, the monitoring device requests the restricting device to remove the passage restriction of the packets which should not be restricted, based on the report. Thus, the passage restriction provided by the restricting device can be made more appropriate.

According to the present invention, the restricting device further includes a determination-result transmitting unit that transmits a result of determination of the signature determining unit to the monitoring device. When the result of determination indicates that the signature is inappropriate, the signature generating unit of the monitoring device generates, based on the result of determination, a new signature indicating the feature of the packet that attacks the communication device.

According to the present invention, the restricting device transmits a determination result of the signature to the monitoring device. When the determination result received indicates that the signature is not appropriate, the monitoring device generates a new signature indicating a feature of a packet which attacks the communication device based on the determination result, thus preventing the restricting device from providing inappropriate passage restriction.

A denial-of-service attack defense method according to another aspect of the present invention is for protecting a communication device against a denial-of-service attack using a monitoring device and a restricting device. The monitoring device is configured to be provided on a local area network to which the communication device that is a target of the denial-of-service attack is connected, and monitors a packet transmitted to the communication device via an internet-service-provider network. The restricting device is configured to be provided on the internet-service-provider network, and restrict a packet to the local area network. The denial-of-service attack defense method includes an attack detecting step of detecting including the monitoring device detecting an attack by the packet on the communication device; a protection-request-information transmitting step of transmitting protection request information indicating a request for protection against the attack to the restricting device; and a packet restricting step of restricting a packet transmitted to the communication device via the internet-service-provider network based on the protection request information.

According to the present invention, the monitoring device detects an attack by packets transmitted to the communication device and transmits the protection request information indicating a request for protection against the attack, to the restricting device. The restricting device restricts packets transmitted to the communication device via the ISP network based on the protection request information received from the monitoring device. Therefore, the ISP is capable of protecting communication devices against the denial-of-service attacks while ensuring secrecy of communications and not deviating from the range of its original operations.

According to the present invention, denial-of-service attack defense method further includes a signature generating step of generating including the monitoring device generating a signature indicating a feature of a packet that attacks the communication device. The protection-request-information transmitting step includes transmitting the protection request information including the signature to the restricting device. The packet restricting step includes restricting a packet corresponding to the signature, which is to be transmitted to the communication device.

According to the present invention, the monitoring device generates a signature indicating a feature of a packet which attacks the communication device, and transmits the protection request information including the signature generated to the restricting device. The restricting device restricts the packet which is toward the communication device and corresponds to the signature received. Therefore, the restricting device can restrict the packet transmitted to the communication device based on the signature indicating the feature of the packet which attacks, which allows the ISP to protect communication devices against the denial-of-service attacks while ensuring secrecy of communications and not deviating from the range of its original operations.

According to the present invention, denial-of-service attack defense method further includes a signature determining step of determining including the restricting device determining whether the protection request information including the signature is appropriate. The packet restricting includes restricting a packet corresponding to a signature that is determined to be appropriate at the signature determining step, which is to be transmitted to the communication device; and not restricting a packet corresponding to a signature that is determined to be inappropriate, which is to be transmitted to the communication device.

According to the present invention, the restricting device determines whether the protection request information including the signature is appropriate, restricts a packet which is toward the communication device and corresponds to the signature that is determined as being appropriate, and does not restrict a packet which is toward the communication device and corresponds to the signature that is determined as being inappropriate. Therefore, when the signature is inappropriate, packets are not restricted. Thus, it is possible to prevent the restricting device from restricting packets such as those which are supposed to be transmitted to another LAN and of which restriction should not be requested by the monitoring device.

According to the present invention, denial-of-service attack defense method further includes the report generating step of generating including the restricting device generating a report on a feature and an amount of a packet corresponding to the signature; and a report transmitting step of transmitting including the restricting device transmitting the report to the monitoring device. The signature generating step includes generating a new signature based on the report. The protection-request-information transmitting step includes transmitting the protection request information including the new signature to the restricting device. The packet restricting step includes restricting a packet corresponding to the new signature, which is to be transmitted to the communication device.

According to the present invention, the restricting device generates a report on features of a packet which corresponds to the signature and on its amount, and transmits the report generated to the monitoring device. The monitoring device generates a new signature based on the report received, and transmits protection request information including the new signature to the restricting device, and then the restricting device restricts a packet which is toward the communication device and corresponds to the new signature. Therefore, when there is an attack on the communication device, suspicious packets that may attack are restricted, and then a packet which attacks is identified based on the report. Thus, it is possible to remove the restriction of a packet which does not attack the communication device.

A denial-of-service attack defense program according to still another aspect of the present invention is for protecting a communication device against a denial-of-service attack using a monitoring device and a restricting device. The monitoring device is configured to be provided on a local area network to which the communication device that is a target of the denial-of-service attack is connected, and monitors a packet transmitted to the communication device via an internet-service-provider network. The restricting device is configured to be provided on the internet-service-provider network, and restricts a packet to the local area network. The denial-of-service attack defense program causes a computer to execute an attack detecting procedure of detecting including the monitoring device detecting an attack by the packet on the communication device; a protection-request-information transmitting procedure of transmitting protection request information indicating a request for protection against the attack to the restricting device; and a packet restricting procedure of restricting a packet transmitted to the communication device via the internet-service-provider network based on the protection request information.

According to the present invention, the monitoring device detects an attack by packets transmitted to the communication device and transmits the protection request information indicating a request for protection against the attack, to the restricting device. The restricting device restricts packets transmitted to the communication device via the ISP network based on the protection request information received from the monitoring device. Therefore, the ISP is capable of protecting communication devices against the denial-of-service attacks while ensuring secrecy of communications and not deviating from the range of its original operations.

According to the present invention, the denial-of-service attack defense program further causes the computer to execute a signature generating procedure of generating including the monitoring device generating a signature indicating a feature of a packet that attacks the communication device. The protection-request-information transmitting procedure includes transmitting the protection request information including the signature to the restricting device. The packet restricting procedure includes restricting a packet corresponding to the signature, which is to be transmitted to the communication device.

According to the present invention, the monitoring device generates a signature indicating a feature of a packet which attacks the communication device, and transmits the protection request information including the signature generated to the restricting device. The restricting device restricts the packet which is toward the communication device and corresponds to the signature received. Therefore, the restricting device can restrict the packet transmitted to the communication device based on the signature indicating the feature of the packet which attacks, which allows the ISP to protect communication devices against the denial-of-service attacks while ensuring secrecy of communications and not deviating from the range of its original operations.

According to the present invention, the denial-of-service attack defense program further causes the computer to execute a signature determining procedure of determining including the restricting device determining whether the protection request information including the signature is appropriate. The packet restricting includes restricting a packet corresponding to a signature that is determined to be appropriate at the signature determining procedure, which is to be transmitted to the communication device; and not restricting a packet corresponding to a signature that is determined to be inappropriate, which is to be transmitted to the communication device.

According to the present invention, the restricting device determines whether the protection request information including the signature is appropriate, restricts a packet which is toward the communication device and corresponds to the signature that is determined as being appropriate, and does not restrict a packet which is toward the communication device and corresponds to the signature that is determined as being inappropriate. Therefore, when the signature is inappropriate, packets are not restricted. Thus, it is possible to prevent the restricting device from restricting packets such as those which are supposed to be transmitted to another LAN and of which restriction should not be requested by the monitoring device.

According to the present invention, the denial-of-service attack defense program further causes the computer to execute a report generating procedure of generating including the restricting device generating a report on a feature and an amount of a packet corresponding to the signature; and a report transmitting procedure of transmitting including the restricting device transmitting the report to the monitoring device. The signature generating procedure includes generating a new signature based on the report. The protection-request-information transmitting procedure includes transmitting the protection request information including the new signature to the restricting device. The packet restricting procedure includes restricting a packet corresponding to the new signature, which is to be transmitted to the communication device.

According to the present invention, the restricting device generates a report on features of a packet which corresponds to the signature and on its amount, and transmits the report generated to the monitoring device. The monitoring device generates a new signature based on the report received, and transmits protection request information including the new signature to the restricting device, and then the restricting device restricts a packet which is toward the communication device and corresponds to the new signature. Therefore, when there is an attack on the communication device, suspicious packets that may attack are restricted, and then a packet which attacks is identified based on the report. Thus, it is possible to remove the restriction of a packet which does not attack the communication device.

Effect of the Invention

According to the present invention, the monitoring device detects an attack by packets transmitted to the communication device and transmits the protection request information indicating a request for protection against the attack, to the restricting device. The restricting device restricts packets transmitted to the communication device via the ISP network based on the protection request information received from the monitoring device. Therefore, the ISP is capable of protecting communication devices against the denial-of-service attacks while ensuring secrecy of communications and not deviating from the range of its original operations.

Furthermore, according to the present invention, the monitoring device generates a signature indicating a feature of a packet which attacks the communication device, and transmits the protection request information including the signature generated to the restricting device. The restricting device restricts the packet which is toward the communication device and corresponds to the signature received. Therefore, the restricting device can restrict the packet transmitted to the communication device based on the signature indicating the feature of the packet which attacks, which allows the ISP to protect communication devices against the denial-of-service attacks while ensuring secrecy of communications and not deviating from the range of its original operations.

Moreover, according to the present invention, the restricting device determines whether the protection request information including the signature is appropriate, restricts a packet which is toward the communication device and corresponds to the signature that is determined as being appropriate, and does not restrict a packet which is toward the communication device and corresponds to the signature that is determined as being inappropriate. Therefore, when the signature is inappropriate, packets are not restricted. Thus, it is possible to prevent the restricting device from restricting packets such as those which are supposed to be transmitted to another LAN and of which restriction should not be requested by the monitoring device.

Furthermore, according to the present invention, the restricting device generates a report on features of a packet which corresponds to the signature and on its amount, and transmits the report generated to the monitoring device. The monitoring device generates a new signature based on the report received, and transmits protection request information including the new signature to the restricting device, and then the restricting device restricts a packet which is toward the communication device and corresponds to the new signature. Therefore, when there is an attack on the communication device, suspicious packets that may attack are restricted, and then a packet which attacks is identified based on the report. Thus, it is possible to remove the restriction of a packet which does not attack the communication device.

Moreover, according to the present invention, the restricting device determines whether the protection request information should be forwarded based on the report generated a the report generating unit, and forwards the protection request information to another restricting device when it is determined that the forwarding is necessary. Therefore, the monitoring device requests the restricting device to remove the passage restriction of the packets which should not be restricted, based on the report. Thus, the passage restriction provided by the restricting device can be made more appropriate.

Furthermore, according to the present invention, the restricting device transmits a determination result of the signature to the monitoring device. When the determination result received indicates that the signature is not appropriate, the monitoring device generates a new signature indicating a feature of a packet which attacks the communication device based on the determination result, thus preventing the restricting device from providing inappropriate passage restriction.

BRIEF DESCRIPTION OF DRAWINGS

FIG. 3 is a diagram of one example of attack detection conditions according to the embodiment;

EXPLANATIONS OF LETTERS OR NUMERALS

Figure 1:
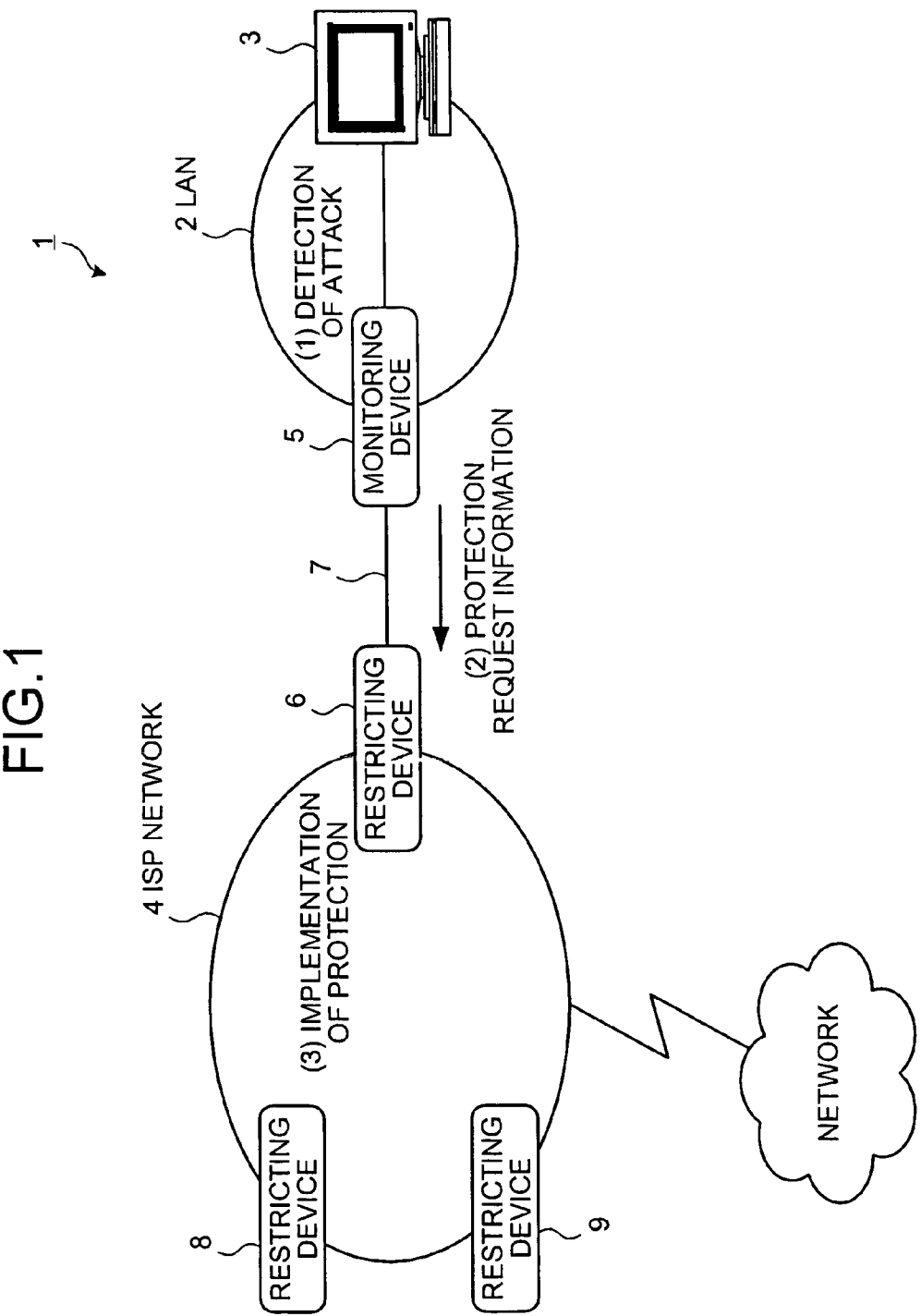
FIG. 1 is a block diagram of the configuration of a denial-of-service attack defense system according to one embodiment of the present invention.

1 Denial-of-service attack defense system
2 LAN
3 Communication device
4 ISP network
5 Packet monitoring device
6, 8, 9 Packet restricting device
7 Transmission line 10 Attack detecting unit
11 Protection-request-information transmitting unit
12 Signature generating unit
13, 14, 26, 27 Communication interface
15, 28 Switch
20 Packet restricting unit 21 Protection-request-information forwarding unit
22 Signature determining unit
23 Determination-result transmitting unit
24 Report generating unit
25 Report transmitting unit

BEST MODE(S) FOR CARRYING OUT THE INVENTION

Exemplary embodiments of a denial-of-service attack defense system, a denial-of-service attack defense method, and a denial-of-service attack defense program according to the present invention are explained in detail below with reference to the attached drawings.

Embodiments

FIG. 1 is a block diagram of the configuration of a denial-of-service attack defense system 1 according to one embodiment of the present invention. The denial-of-service attack defense system 1 shown in FIG. 1 is a system for protecting a communication device 3 against a denial-of-service attack by a monitoring device 5 and a restricting device 6. More specifically, when detecting a denial-of-service attack on the communication device 3 (step (1) of FIG. 1), the monitoring device 5 on a LAN 2 generates a signature indicating a feature of the attack, and transmits protection request information including the signature generated to the restricting device 6 on an ISP network 4 (step (2) of FIG. 1). The restricting device 6 having received the protection request information restricts the passage of a packet for performing the denial-of-service attack based on the signature included in the protection request information, to thereby implement the protection (step (3) of FIG. 1).

Conventionally, even if a suspicious packet which may attack has passed, the restricting device 6 on the ISP network 4 cannot determine whether the packet is an attack, because there are many cases where the determination requires interpretation of information included in the packet and the interpretation can be performed only by a person who receives the packet. Therefore, because the ISP which administrates the ISP network 4 has to ensure secrecy of communications and not to deviate from the range of its original operations, the ISP cannot restrict the packet except for some cases where it is determined that the attack is apparent. In the embodiment, the monitoring device 5 on the LAN 2 interprets the information contained in the packet, and the restricting device 6 on the ISP network 4 restricts the passage of the packet detected by the monitoring device as an attacking one. Consequently, in the embodiment, the ISP can ensure secrecy of communications and effectively restrict a packet which attacks the communication device 3 within the range of its original operations.

Moreover, when the passage of the attacking packet detected by the monitoring device 5 is restricted, the restricting device 6 transmits a report indicating the content of the passage restriction to the monitoring device 5. Therefore, the monitoring device 5 requests the restricting device 6, based on the report, to remove the passage restriction of a packet which should not be restricted, thus, enabling to make the passage restriction provided by the restricting device 6 more appropriate.

Furthermore, when the passage restriction of the packet is requested from the monitoring device 5, the restricting device 6 provides the passage restriction only to a packet related to the content requested which is appropriate, thus, preventing the restricting device 6 from providing inappropriate passage restriction.

The system configuration of the denial-of-service attack defense system 1 is explained below. As shown in FIG. 1, the denial-of-service attack defense system 1 includes the monitoring device 5 which is provided on the LAN 2 in a small-and-medium company and monitors packets transmitted to at least one communication device 3, which is connected to the LAN 2, through the ISP network 4 such as a backbone network; and the restricting device 6 that connects the LAN 2 to the ISP network 4. However, the configuration of the denial-of-service attack detecting system 1 shown in FIG. 1 is only one example, and the denial-of-service attack detecting system according to the present invention may also include a plurality of restricting devices 6, and may further include a plurality of monitoring devices 5 corresponding to the restricting devices 6, respectively.

The monitoring device 5 is formed with a router that constitutes the LAN 2. The monitoring device 5 may also be formed with a firewall, etc. provided on the LAN 2.

Figure 2:
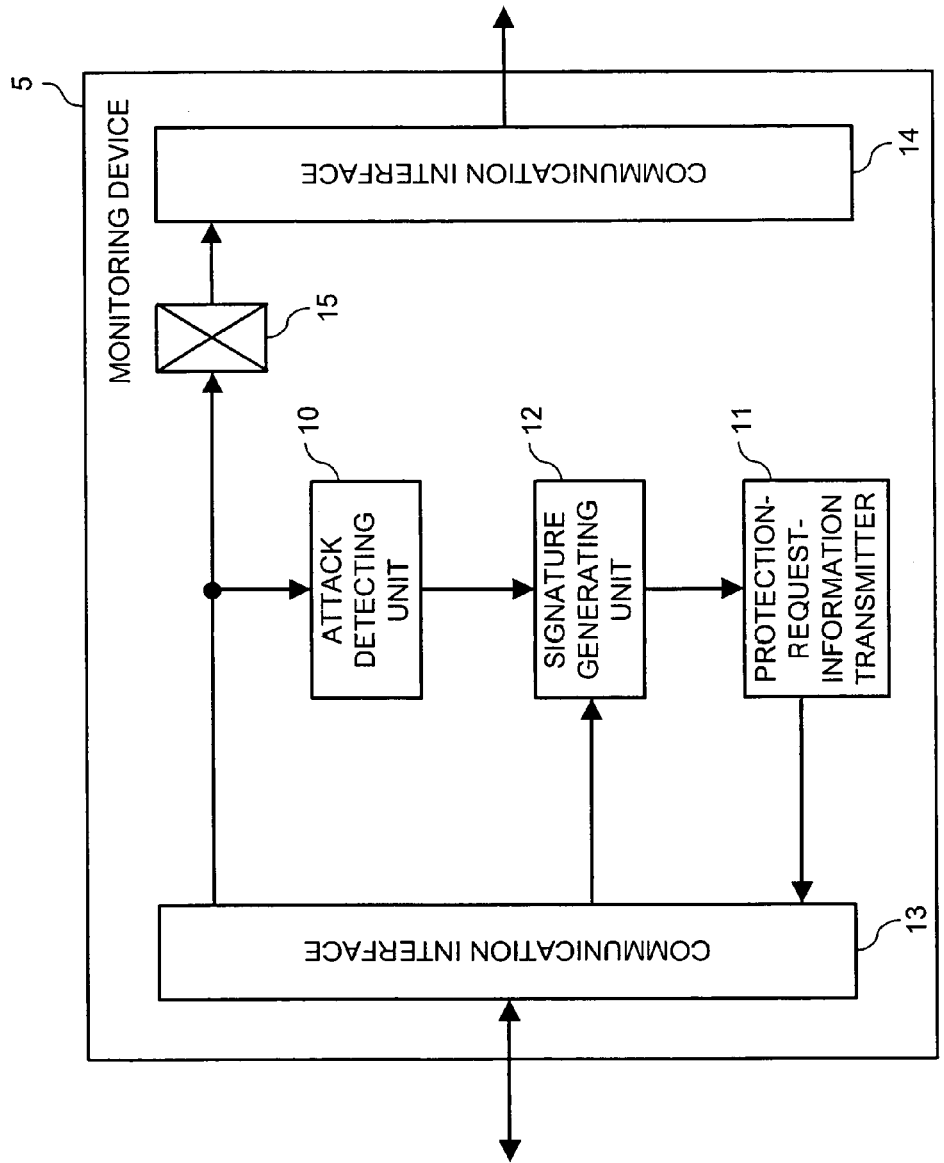
FIG. 2 is a block diagram of the configuration of a monitoring device shown in FIG. 1.

FIG. 2 is a block diagram of the configuration of the monitoring device 5 shown in FIG. 1. The monitoring device 5 includes an attack detecting unit 10 that detects an attack by packets transmitted to the communication device 3; a protection-request-information transmitting unit 11 that transmits protection request information indicating a request for protection against an attack, to the restricting device 6; a signature generating unit 12 that generates a signature indicating a feature of a packet which attacks the communication device 3; communication interfaces 13 and 14 for performing communications with the restricting device 6 and each of the devices provided on the LAN 2, respectively; and a switch 15 for routing a packet.

The attack detecting unit 10 is a processor that detects an attack based on preset attack detection conditions. FIG. 3 is a diagram of one example of the attack detection conditions. In FIG. 3, the attack detection conditions include three sets of records, a set of detection attributes, a set of detection thresholds, and a set of detection times. The detection attribute indicates an attribute of a packet as a target for detection, the detection threshold indicates a threshold of a transmission rate of a packet as a target for detection, and the detection time indicates a threshold of a time during which the transmission rate of a packet as a target for detection exceeds the detection threshold.

For example, a first detection condition is applied to a packet as a target for detection, in which destination address information is 192.168.1.1 (Dst=192.168.1.1/32), a protocol of a transport layer is TCP (Transmission Control Protocol) (Protocol=TCP), and a TCP port number is 80 (Port=80). If a state such that the transmission rate of the packets as targets for detection exceeds 500 kbps continues 10 seconds or more, this state is detected as an attack due to the packets as targets for detection.

Likewise, a second detection condition is applied to a packet as a target for detection, in which destination address information is 192.168.1.2 (Dst=192.168.1.2/32), and a protocol of a transport layer is UDP (User Datagram Protocol) (Protocol=UDP). If a state such that the transmission rate of the packets as targets for detection exceeds 300 kbps continues 10 seconds or more, this state is detected as an attack due to the packets as targets for detection.

A third detection condition is applied to a packet as a target for detection, in which destination address information is in a range of 192.168.1.0 to 192.168.1.255 (Dst=192.168.1.0/24). If a state such that the transmission rate of the packets as targets for detection exceeds 1 Mbps continues 20 seconds or more, this state is detected as an attack due to the packets as targets for detection.

When the attack by the packets as targets for detection is detected by the attack detecting unit 10 in the above manner, the signature generating unit 12 generates a signature indicating the feature of each packet as a target for detection. For example, if the attack that matches the first detection condition of the attack detection conditions of FIG. 3 is detected, then the signature generating unit 12 generates a signature indicating a packet in which the destination address information is 192.168.1.1, the protocol of the transport layer is TCP, and the TCP port number is 80. The signature may contain specification of processes such as shaping and filtering as a method of controlling a packet being the target, and also contain parameters for the processes.

The protection-request-information transmitting unit 11 is a processor that transmits protection request information including the signature generated by the signature generating unit 12 and indicating a request for protection against an attack, to the restricting device 6. The protection-request-information transmitting unit 11 also transmits thereto a certificate, indicating that the own device is the monitoring device 5 which is authorized, included in the protection request information. By including the certificate in the protection request information in this manner, spoofing by any unauthorized device can be prevented. It is noted that the protection-request-information transmitting unit 11 may also transmit the protection request information through a communication line different from a transmission line 7 through which packets are transmitted or received.

The restricting device 6 shown in FIG. 1 is formed with an edge router for connecting the LAN 2 to the ISP network 4. The configuration of the restricting device 6 is explained here for convenience in explanation, but other restricting devices 8 and 9 are configured in the same manner as the restricting device 6.

Figure 4:
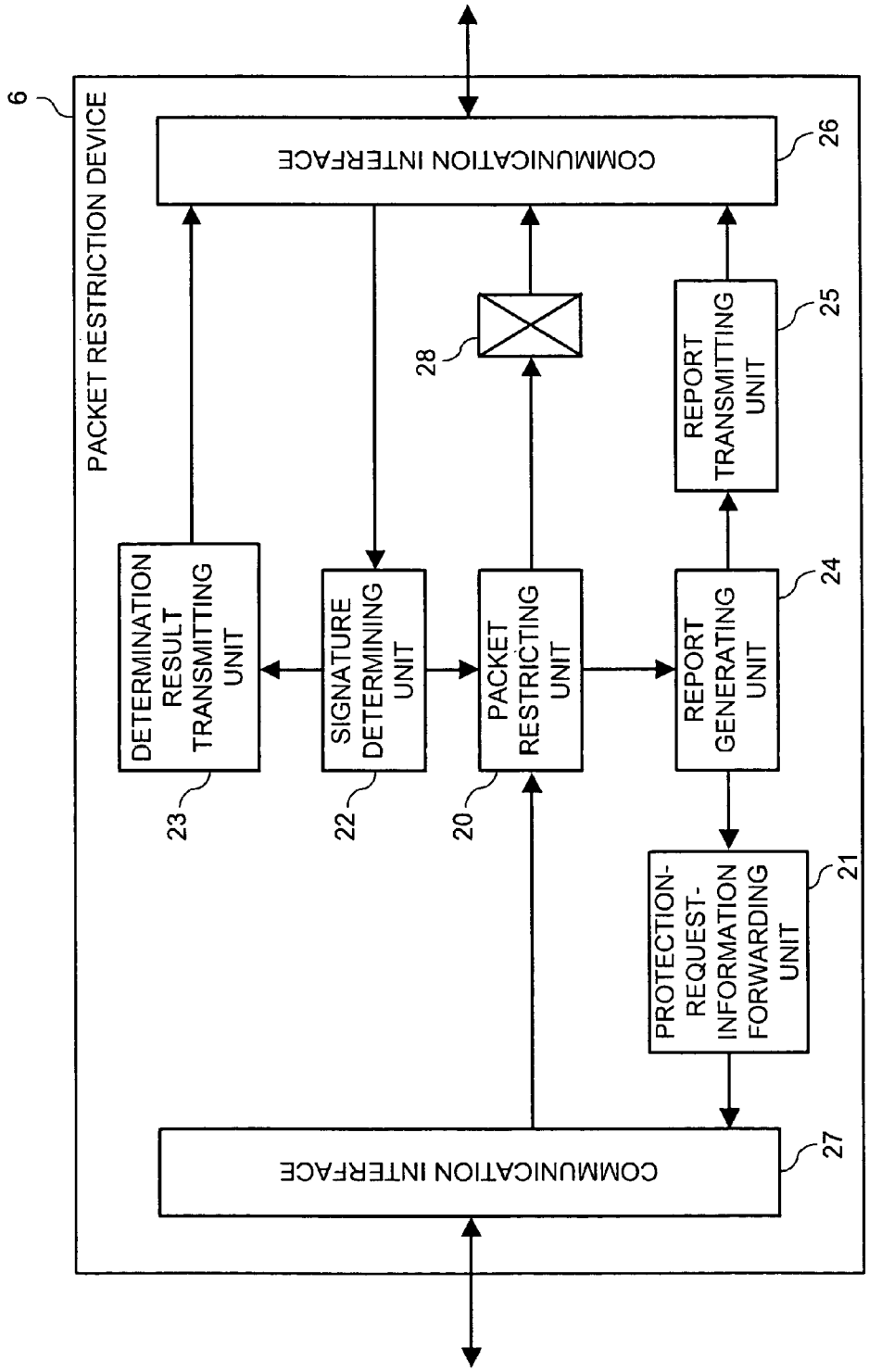
FIG. 4 is a block diagram of the configuration of a restricting device shown in FIG. 1.

FIG. 4 is a block diagram of the configuration of the restricting device 6 shown in FIG. 1. The restricting device 6 includes a packet restricting unit 20 that restricts a packet transmitted to the communication device 3 via the ISP network 4 based on protection request information; a protection-request-information forwarding unit 21 that forwards the protection request information to another packet restricting unit; a signature determining unit 22 that determines whether the protection request information including a signature is appropriate; a determination-result transmitting unit 23 that transmits a determination result of the signature determining unit 22 to the monitoring device 5; a report generating unit 24 that generates a report on features of a packet which corresponds to the signature and on its amount; a report transmitting unit 25 that transmits the report to the monitoring device 5; communication interfaces 26 and 27 for performing communications with the monitoring device 5 and each of the devices provided on the ISP network 4, respectively; and a switch 28 for routing a packet.

The signature determining unit 22 is a processor that determines whether the protection request information including the signature transmitted from the monitoring device 5 is appropriate. Herein, the signature determining unit 22 prevents a packet from being restricted by the restricting device 6, the packet being transmitted to another LAN, so that its restriction should not be requested by the monitoring device 5.

The signature determining unit 22 is also a processor that determines whether the protection request information is appropriate based on the certificate included in the protection request information. For example, if the certificate is not included in the protection request information, the monitoring device 5 being a transmission source is quite possible to be an unauthorized device. Therefore, the signature determining unit 22 determines that this protection request information is inappropriate. Even if the certificate is included in the protection request information, if the certificate is not authenticated by a valid certificate authority, then it is determined that the protection request information is also inappropriate.

The packet restricting unit 20 is a processor that restricts a packet corresponding to the signature included in the protection request information which is transmitted from the monitoring device 5, when the signature determining unit 22 determines that the protection request information including the signature is appropriate.

The determination-result transmitting unit 23 transmits a determination result of the signature determining unit 22 to the monitoring device 5. The determination-result transmitting unit 23 may also transmit the determination result through a communication line different from the transmission line 7 through which packets are transmitted or received.

Here, the signature generating unit 12 of the monitoring device 5 may regenerate a signature according to the determination result received. For example, there is a case where the protection request information transmitted by the protection-request-information transmitting unit 11 indicates a request for restriction of a packet which is transmitted from a certain network address, the signature determining unit 22 determines that the request is not appropriate, and where the determination-result transmitting unit 23 transmits the result of determination. In this case, the signature generating unit 12 measures each traffic volume via the attack detecting unit 10, and regenerates a signature so as to restrict a packet transmitted from a host with high traffic in a network indicated by the network address.

The regeneration of the signature by the signature generating unit 12 may also be performed through the operation by an administrator of the LAN 2 who views the determination result transmitted by the determination-result transmitting unit 23.

The report generating unit 24 is a processor that generates a report on features of a packet, which corresponds to the signature included in the protection request information transmitted from the monitoring device 5, and on its amount. For example, the report generating unit 24 generates a report including a table in which source address information included in a header part of the packet corresponding to the signature is coupled to the amount of the packet transmitted.

The report transmitting unit 25 transmits the report generated by the report generating unit 24 to the monitoring device 5. The report transmitting unit 25 may also transmit the report through a communication line different from the transmission line 7 through which packets are transmitted or received.

The signature generating unit 12 of the monitoring device 5 regenerates a signature according to the report received. The regeneration of the signature by the signature generating unit 12 may also be performed through the operation by the administrator of the LAN 2 who views the report transmitted by the report transmitting unit 25.

The protection-request-information transmitting unit 11 of the monitoring device 5 retransmits the protection request information including the signature regenerated by the signature generating unit 12 to the restricting device 6. And when the signature determining unit 22 determines that the protection request information including the signature is appropriate, the packet restricting unit 20 of the restricting device 6 restricts the packet corresponding to the signature included in the protection request information retransmitted from the monitoring device 5.

By regenerating the signature based on the report in the above manner, it is possible to identify a packet which does not attack the communication device 3 or a packet which actually attacks the communication device 3, and to provide a restriction in such a manner that packets as targets of restriction are narrowed down. This allows removal of the restriction of a packet which does not attack the communication device 3 and therefore should not be restricted.

The protection-request-information forwarding unit 21 determines whether the protection request information transmitted from the monitoring device 5 should be forwarded to other packet restricting device (e.g., the restricting devices 8 and 9 of FIG. 1) configured in the same manner as that of the restricting device 6, based on the report generated by the report generating unit 24. When it is determined that the protection request information should be transmitted to the other packet restricting device, the protection-request-information forwarding unit 21 forwards the protection request information to the other packet restricting device.

Figure 5:
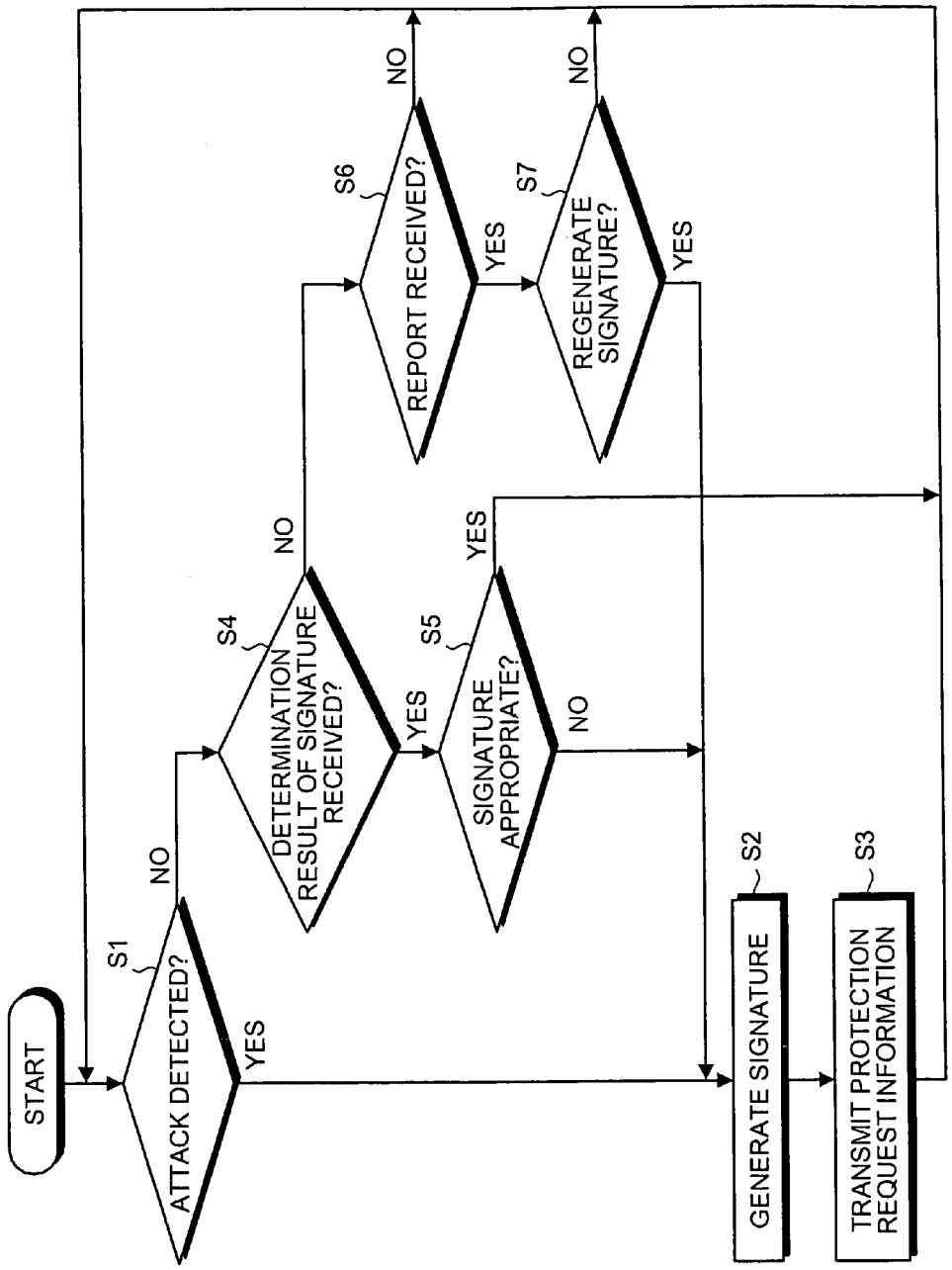
FIG. 5 is a flowchart of the operation for detecting an attack in the monitoring device shown in FIG. 2.

The operations in the denial-of-service attack defense system 1 configured in the above manner are explained below with reference to FIG. 5 to FIG. 7. FIG. 5 is a flowchart of the operation for detecting an attack in the monitoring device 5 shown in FIG. 2.

When the attack detecting unit 10 detects an attack by packets transmitted to the communication device 3 based on the attack detection conditions (step S1), the signature generating unit 12 generates a signature indicating the feature of each of the packets which are detected as an attack (step S2), and the protection-request-information transmitting unit 11 transmits the protection request information including the signature generated to the restricting device 6 (step S3).

The communication interface 13 receives the determination result on whether the protection request information including the signature transmitted from the restricting device 6 is appropriate according to transmission of the protection request information (step S4). When the determination result indicates that the signature is inappropriate (step S5), the signature generating unit 12 regenerates a signature based on the determination result (step S2), and the protection-request-information transmitting unit 11 retransmits the protection request information including the signature regenerated to the restricting device 6 (step S3).

The report transmitted by the restricting device 6 is received by the communication interface 13 (step S6), the signature generating unit 12 determines whether a signature should be regenerated, based on the report received (step S7). When it is determined that the signature should be regenerated, the signature generating unit 12 regenerates the signature based on the report (step S2), and the protection-request-information transmitting unit 11 retransmits the protection request information including the signature regenerated to the restricting device 6 (step S3).

Figure 6:
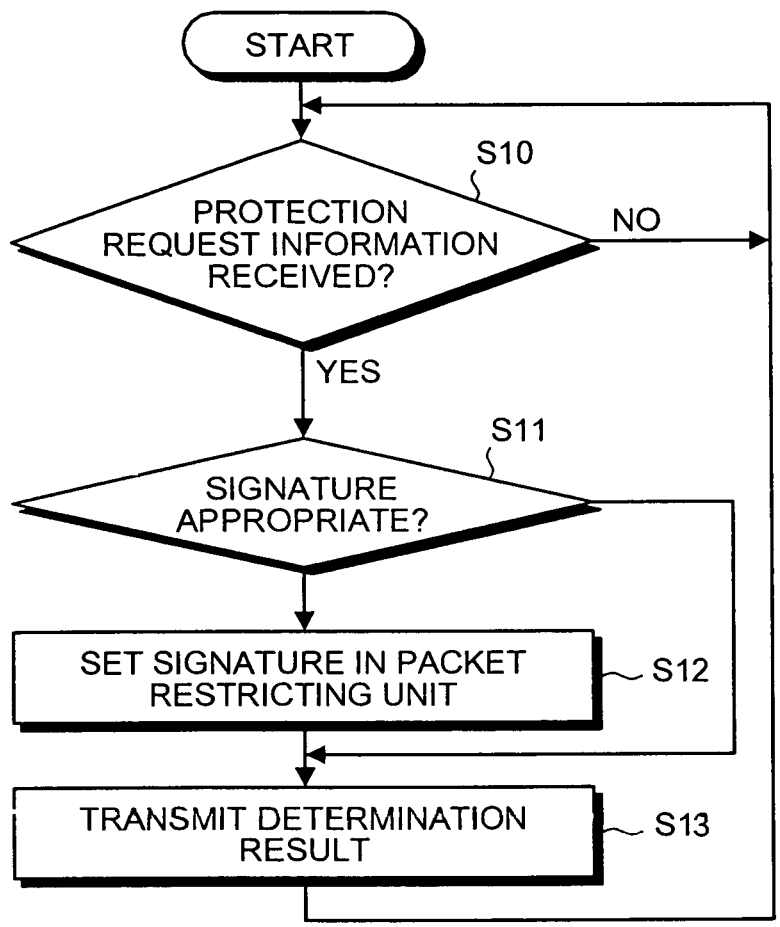
FIG. 6 is a flowchart of the operation for receiving protection request information in the restricting device shown in FIG. 4.

FIG. 6 is a flowchart of the operation for receiving the protection request information in the restricting device 6 shown in FIG. 4. When the communication interface 26 receives the protection request information transmitted from the monitoring device 5 (step S10), the signature determining unit 22 determines whether the signature and other information included in the protection request information received are appropriate (step S11).

When it is determined by the signature determining unit 22 that the signature and other information included in the protection request information received are appropriate, the signature is set in the packet restricting unit 20 (step S12). The determination-result transmitting unit 23 transmits the result of determination, by the signature determining unit 22, on whether the signature and other information included in the protection request information received are appropriate, to the monitoring device 5 (step S13).

Figure 7:
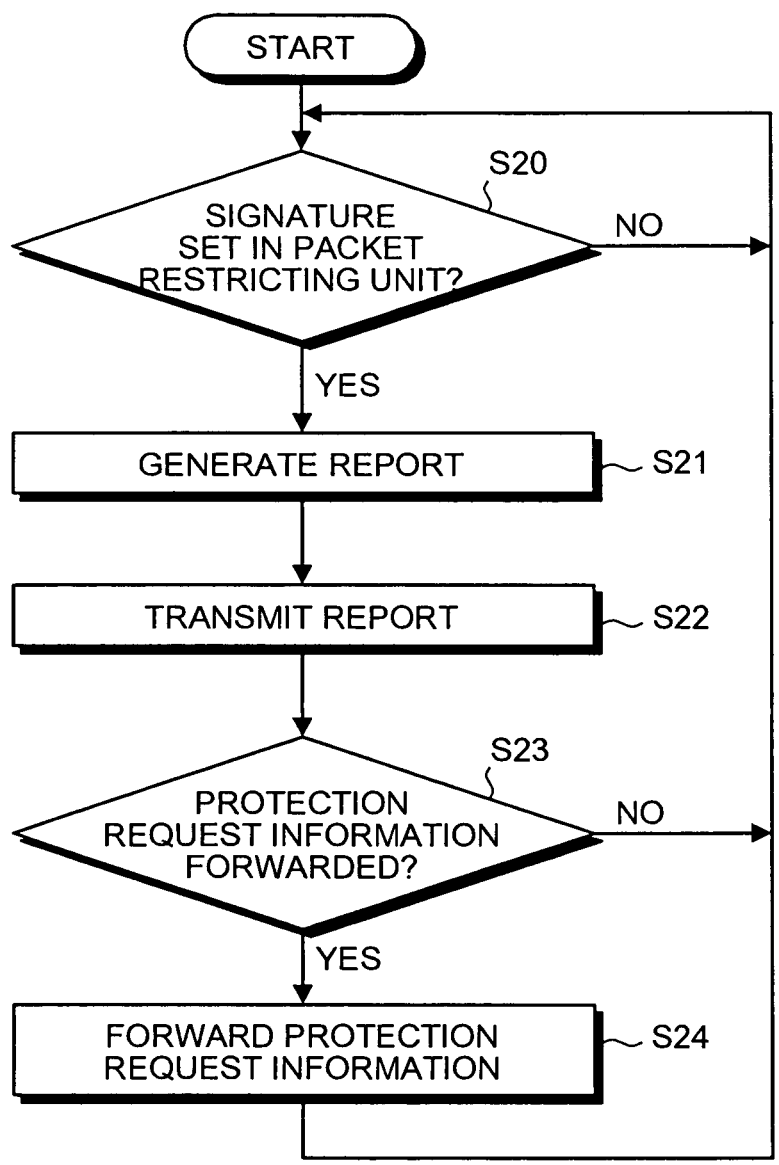
FIG. 7 is a flowchart of the operation for report transmission in the restricting device shown in FIG. 4.

FIG. 7 is a flowchart of the operation for report transmission in the restricting device 6 shown in FIG. 4. When the signature is set in the packet restricting unit 20 (step S20), the report generating unit 24 generates a report on features of a packet, which corresponds to the signature included in the protection request information transmitted from the monitoring device 5, and on its amount (step S21), and the report transmitting unit 25 transmits the report generated to the monitoring device 5 (step S22).

The protection-request-information forwarding unit 21 determines whether the protection request information received by the communication interface 26 should be forwarded to the other packet restricting device such as the restricting devices 8 and 9, based on the report generated by the report generating unit 24 (step S23). When it is determined that the protection request information should be forwarded to the other packet restricting device, the protection-request-information forwarding unit 21 forwards the protection request information to the other packet restricting device (step S24).

In this manner, the monitoring device 5 detects the end of the attack based on the report transmitted by the report transmitting unit 25, and the protection-request-information transmitting unit 11 transmits predetermined protection request information to the restricting device 6. Consequently, the packet restricting unit 20 removes the restriction of packets.

As explained above, in the denial-of-service attack defense system 1, the LAN 2 side detects an attack on the communication device 3, and the restricting device 6 on the ISP network 4 side restricts packets transmitted to the communication device 3 based on the request for protection against the attack detected. Thus, the ISP can protect the communication device 3 against the denial-of-service attack while ensuring secrecy of communications and not deviating from the range of its original operations.

The monitoring device and the restricting device according to the embodiment implement their functions by causing each computer to load a program thereinto and execute it. More specifically, a program, including a routine which detects a packet attacking a communication device and a routine which transmits protection request information to the restricting device, is stored in ROM (Read Only Memory) etc. of the computer in the monitoring device. Furthermore, a program, including a routine which restricts the passage of a packet that may attack a communication device based on the protection request information, is stored in ROM etc. of the computer in the restricting device. Each of the devices loads relevant one of the programs into its CPU and executes it, and it is thereby possible to form the monitoring device and the restricting device according to the present invention.

INDUSTRIAL APPLICABILITY

As explained above, the denial-of-service attack defense system, the denial-of-service attack defense method, and the denial-of-service attack defense program according to the present invention are suitable for protection of communication devices against the denial-of-service attacks.

The invention claimed is:
1. A system for protecting a communication device against a denial-of-service attack, the system comprising:
a monitoring device provided on a local area network including the communication device, the monitoring device being configured to monitor a packet transmitted to the communication device via an internet-service-provider network; and a restricting device provided on the internet-service-provider network, the restricting device being configured to restrict a packet to the local area network, wherein the monitoring device includes
an attack detecting unit configured to detect an attack by the packet on the communication device based on an attack detection condition including a destination address and a port number of the packet, and
a protection-request-information transmitting unit configured to transmit to the restricting device protection request information indicating a request for protection against the attack, the protection request information including a certificate authenticating the monitoring device, a signature indicating a feature including the destination address and the port number of a packet that attacks the communication device, the protection-request-information transmitting unit being configured to update the protection request information to remove packets not included in the attack from restriction based on a report of received packets transmitted from the restricting device, and
the restricting device includes a packet restricting unit configured to restrict a packet transmitted to the communication device via the internet-service-provider network based on the protection request information.

2. The system according to claim 1, wherein
the monitoring device further includes a signature generating unit configured to generate the signature,
the protection-request-information transmitting unit transmits the protection request information including the signature to the restricting device, and
the packet restricting unit restricts a packet corresponding to the signature.

3. The system according to claim 2, wherein
the restricting device further includes a signature determining unit configured to determine whether the protection request information including the signature is appropriate based on the certificate, and
the packet restricting unit restricts a packet corresponding to a signature determined to be appropriate, and does not restrict a packet corresponding to a signature determined to be inappropriate.

4. The system according to claim 3, wherein
the restricting device further includes a determination-result transmitting unit configured to transmit a determination result of the signature determining unit to the monitoring device, the signature generating unit of the monitoring device generating a new signature indicating the feature of the packet that attacks the communication device when the determination result indicates that the signature is inappropriate.

5. The system according to claim 2, wherein
the restricting device further includes
a report generating unit configured to generate a report including a feature and an amount of packets corresponding to the signature, and a report transmitting unit configured to transmit the report to the monitoring device,
the signature generating unit generates a new signature based on the report,
the protection-request-information transmitting unit transmits the protection request information including the new signature to the restricting device, and
the packet restricting unit restricts a packet corresponding to the new signature.

6. The system according to claim 5, wherein
the restricting device further includes a forwarding unit configured to forward the protection request information to other restricting devices provided on the internet-service-provider network, the forwarding unit being configured to determine whether to forward the protection request information based on the report generated by the report generating unit.

7. A method of causing a monitoring device and a restricting device to protect a communication device against a denial-of-service attack, the monitoring device being provided on a local area network including the communication device and being configured to monitor a packet transmitted to the communication device via an internet-service-provider network, the restricting device being provided on the internet-service-provider network and being configured to restrict a packet to the local area network, the method comprising:
detecting, at the monitoring device, an attack by the packet on the communication device based on an attack detection condition including a destination address and a port number of the packet;
transmitting, from the monitoring device to the restricting device, a protection request information indicating a request for protection against the attack, the protection request information including a certificate authenticating the monitoring device, a signature indicating a feature including the destination address and the port number of a packet that attacks the communication device;
restricting, at the restricting device, packets transmitted to the communication device via the internet-service-provider network based on the protection request information;
transmitting, from the restricting device to the monitoring device, a report including information on packets included in the attack; and
transmitting, from the monitoring device to the restricting device, an updated protection request information removing packets not included in the attack from restriction based on the report.

8. The method according to claim 7, further comprising:
generating, at the monitoring device, the signature, wherein
protection request information transmitted to the restricting device includes the signature, and
a packet corresponding to the signature is restricted.

9. The method according to claim 8, further comprising:
determining, at the restricting device, whether the protection request information including the signature is appropriate based on the certificate,
wherein a packet corresponding to a signature determined to be appropriate is restricted, and a packet corresponding to a signature determined to be inappropriate is not restricted.

10. The method according to claim 8, further comprising:
generating, at the restricting device, a report on a feature and an amount of packets corresponding to the signature; and
transmitting the report from the restricting device to the monitoring device,
wherein a new signature is generated at the monitoring device based on the report, protection request information including the new signature is transmitted to the restricting device, and a packet corresponding to the new signature is restricted.

11. A non-transitory computer-readable medium storing thereon computer-readable instructions for protecting a communication device against a denial-of-service attack using a monitoring device and a restricting device, the monitoring device being provided on a local area network including the communication device and being configured to monitor a packet transmitted to the communication device via an internet-service-provider network, the restricting device being provided on the internet-service-provider network and being configured to restrict a packet to the local area network, the computer-readable instructions when executed by a computer cause the computer to perform the method comprising:
   detecting, at the monitoring device, an attack by the packet on the communication device based on an attack detection condition including an address and a port number of the packet;
   transmitting, from the monitoring device to the restricting device, protection request information indicating a request for protection against the attack, the protection request information including a certificate authenticating the monitoring device, a signature indicating a feature including the destination address and the port number of a packet that attacks the communication device;
   restricting, at the restricting device, a packet transmitted to the communication device via the internet-service-provider network based on the protection request information;
   transmitting, from the restricting device to the monitoring device, a report including information on packets included in the attack; and
   transmitting, from the monitoring device to the restricting device, an updated protection request information removing packets not included in the attack from restriction based on the report.

12. The non-transitory computer-readable medium according to claim 11, further comprising:
   generating, at the monitoring device, the signature;
   transmitting, from the monitoring device to the restricting device, the protection request information including the signature; and
   restricting, at the restricting device, a packet corresponding to the signature.

13. The non-transitory computer-readable medium according to claim 12, further comprising:
   determining, at the restricting device, whether the protection request information including the signature is appropriate based on the certificate;
   restricting a packet corresponding to a signature determined to be appropriate; and
   not restricting a packet corresponding to a signature determined to be inappropriate.

14. The non-transitory computer-readable medium according to claim 12, further comprising:
   generating, at the restricting device, a report on a feature and an amount of packets corresponding to the signature; and
   transmitting the report from the restricting device to the monitoring device;
   generating, at the monitoring device, a new signature based on the report;
   transmitting, from the monitoring device to the restricting device, the protection request information including the new signature; and
   restricting, at the restricting device, a packet corresponding to the new signature.

* * * * *